United States Patent
Kuo

(10) Patent No.: US 7,466,459 B2
(45) Date of Patent: Dec. 16, 2008

(54) METHOD FOR ENHANCING SCAN RESOLUTION

(76) Inventor: Shih-Zheng Kuo, No. 21, Alley 8, Lane 57, Yu-Hsi St., Yungho, Taipei Hsien (TW)

( * ) Notice: Subject to any disclaimer, the term of this patent is extended or adjusted under 35 U.S.C. 154(b) by 493 days.

(21) Appl. No.: 09/955,845

(22) Filed: Sep. 17, 2001

(65) Prior Publication Data

US 2002/0126320 A1 Sep. 12, 2002

(30) Foreign Application Priority Data

Mar. 6, 2001 (TW) .............................. 90105102 A

(51) Int. Cl.
*H04N 1/04* (2006.01)
(52) U.S. Cl. ...................... 358/474; 358/501; 358/475; 382/274; 382/263
(58) Field of Classification Search ................ 358/474, 358/1.2, 501, 505, 506, 509, 513, 447, 448, 358/461, 475; 382/274, 263, 194
See application file for complete search history.

(56) References Cited

U.S. PATENT DOCUMENTS

| | | | | |
|---|---|---|---|---|
| 5,583,662 A * | 12/1996 | Takahashi et al. | ............. | 358/474 |
| 5,860,042 A * | 1/1999 | Tomaru et al. | ................. | 399/92 |
| 5,995,248 A * | 11/1999 | Katori et al. | ................... | 358/2.1 |
| 6,233,059 B1 * | 5/2001 | Kodaira et al. | ................ | 358/1.9 |
| RE37,282 E * | 7/2001 | Smitt | .......................... | 358/474 |
| 6,289,119 B1 * | 9/2001 | Nagata | ........................ | 382/162 |
| 6,538,717 B2 * | 3/2003 | Nakamura et al. | ............. | 355/40 |
| 6,542,260 B1 * | 4/2003 | Gann et al. | .................. | 358/471 |
| 6,575,084 B2 * | 6/2003 | Allen et al. | .................... | 99/451 |
| 6,643,397 B1 * | 11/2003 | Kanamori | ..................... | 382/162 |
| 6,806,870 B1 * | 10/2004 | Takanashi | ..................... | 345/207 |
| 6,836,344 B2 * | 12/2004 | Koide et al. | ................... | 358/1.9 |
| 6,891,645 B1 * | 5/2005 | Nakamura | .................... | 358/474 |
| 7,064,865 B2 * | 6/2006 | Ishikawa | ...................... | 358/1.9 |
| 7,345,793 B2 * | 3/2008 | Chang et al. | ................. | 358/474 |
| 7,355,159 B2 * | 4/2008 | Gann | .......................... | 250/214 C |
| 7,403,308 B2 * | 7/2008 | Moro | ........................... | 358/2.1 |
| 2002/0033975 A1 * | 3/2002 | Yamazaki | ..................... | 358/515 |
| 2004/0047516 A1 * | 3/2004 | Tseng | .......................... | 382/274 |
| 2007/0292036 A1 * | 12/2007 | Nakayama | .................... | 382/232 |
| 2008/0069457 A1 * | 3/2008 | Matsumoto | .................. | 382/232 |

\* cited by examiner

*Primary Examiner*—Edward L. Coles
*Assistant Examiner*—Negussie Worku
(74) *Attorney, Agent, or Firm*—Stolowitz Ford Cowger LLP

(57) ABSTRACT

A method for enhancing scan resolution, suitable for the application of a scanner with a sensor. The range that a detecting cell in the sensor can detect is the original pixels with a predetermined number. The scanned result of the detecting cell is called the scanned pixels. In the method for enhancing scan resolution, a smooth image region is scanned to obtain a smooth image data. The smooth image region includes at least the above original pixels with the predetermined number. The smooth image region has a uniform brightness. According to the smooth image data, the scanned pixels obtained from scanning the document are processed.

35 Claims, 3 Drawing Sheets

METHOD FOR ENHANCING SCAN RESOLUTION

CROSS-REFERENCE TO RELATED APPLICATION

This application claims the priority benefit of Taiwan application serial no. 90105102, filed on Mar. 6, 2001.

BACKGROUND OF THE INVENTION

1. Field of the Invention

The invention relates in general to a processing method for image scanning, and more particularly, the invention relates to a method for enhancing scan resolution.

2. Description of the Related Art

Image conversion apparatus, including copy machines, fax machines, and scanners, convert a visual image into a certain electronic form to allow printing, storing, transmission or other functions. Such an apparatus uses an optical sensor such as a charge coupled device (CCD) or contact image sensor (CIS) is used for image detection. For a color display, the common structure of the optical sensor is formed of red, green and blue CCD devices. All the CCD devices are exposed for a certain period of time. The sensed charges are then delivered to the analog shifter buffer for the subsequent processes.

Typically, to enhance the resolution, the forwarding distance of the optical sensor is reduced for each scan, so that more image data are obtained. Consequently, the size of the detecting cell in the optical sensor cannot be varied, and the brightness obtained by the optical sensor is an average of brightness for several points. To enhance the resolution obtained by this method, the performance of the scanner in modulation transfer function (MTF) is deteriorated.

SUMMARY OF THE INVENTION

The invention provides a method of enhancing scan resolution. By scanning a smooth image region with a uniform brightness, a standard brightness can be obtained as a reference for calculation. According to the standard brightness, the brightness of each pixel can be calculated to enhance the performance in modulation transfer function.

The above method to enhance resolution is suitable for use in a scanner with a sensor. The range that a detecting cell of the sensor can detect is the original pixels with a predetermined number. The result of one detection by the detecting cell is called a scanned pixel. A smooth image region is scanned to obtain a smooth image data. The smooth image region includes at least the original pixels with the predetermined number and has a uniform brightness. According to the smooth image data, the scanned image obtained by scanning document is then processed.

In one embodiment of the invention, a calculated smooth brightness of the original pixel corresponding to the scanned pixel in the smooth image is obtained. The calculated brightness corresponding to the original pixel with the determined number minus one in the smooth image is used as a standard. The calculated brightness corresponding to each original pixel in a document is calculated. A pre-pixel number is defined as the number of the original pixel prior to the original pixel to be calculated in the document. When the pre-pixel number is greater than or equal to the predetermined number minus one, the brightness of the scanned pixel is compared to the calculated brightness of the original pixel prior to the original pixel to be calculated, so that a calculated brightness of the original pixel to be calculated is obtained. When the pre-pixel number is smaller than the predetermined number minus one, the brightness of the scanned pixel is compared to the calculated brightness of each original pixel prior to the original pixel to be calculated. The brightness of the scanned pixel is further compared to the calculated smooth brightness with a number equal to the predetermined number minus the pre-pixel number and minus one. A calculated brightness of the original pixel to be calculated is thus obtained.

According to the above, using the smooth image region with the same brightness as the standard and through proper calculation, a resolution and a modulation transfer function better than the conventional method are thus obtained.

Both the foregoing general description and the following detailed description are exemplary and explanatory only and are not restrictive of the invention, as claimed.

DESCRIPTION OF THE PREFERRED EMBODIMENTS

Figure 1:
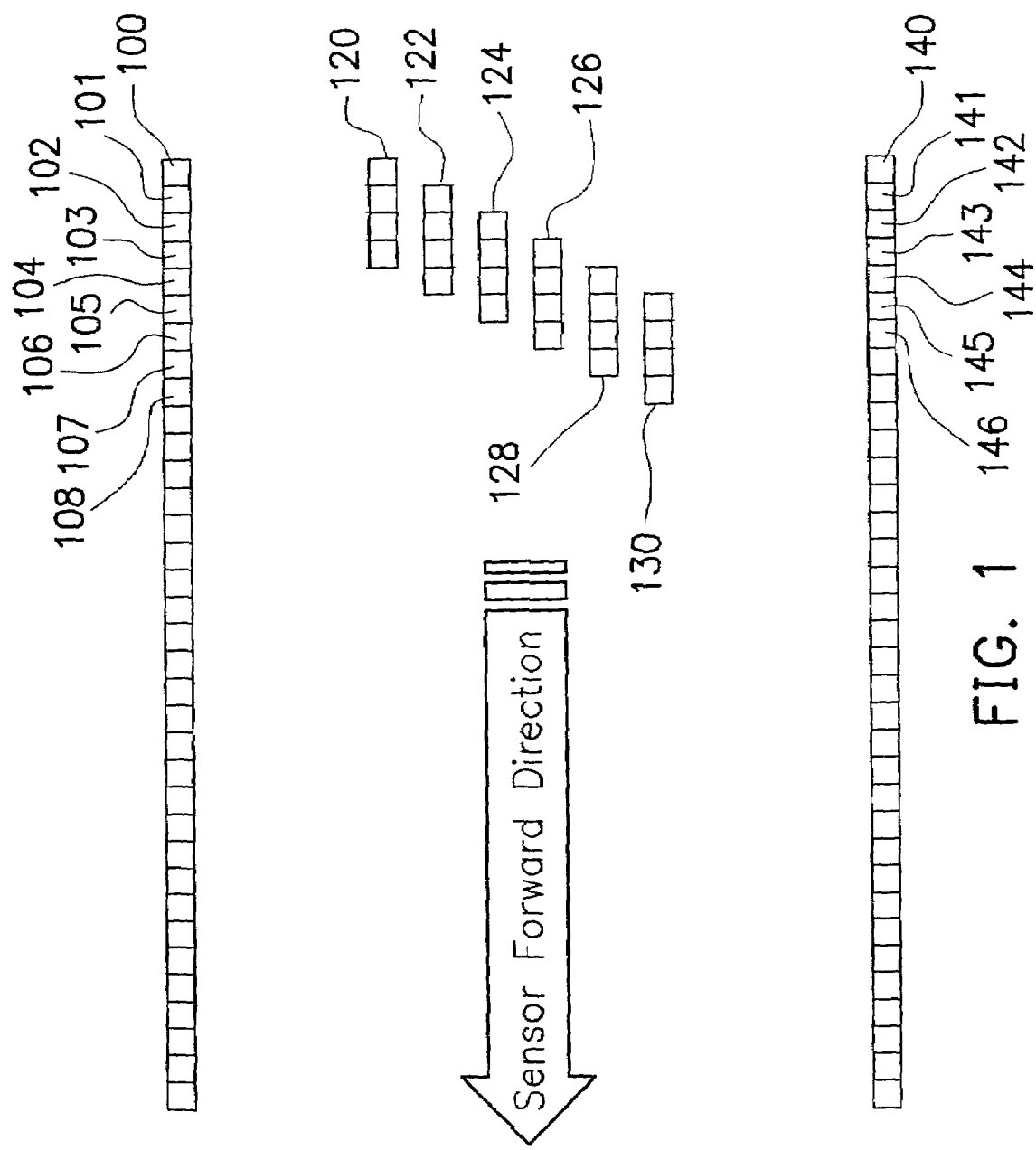
FIG. 1 is a schematic drawing of one embodiment of the invention.

In FIG. 1, an embodiment of the invention is shown. In this embodiment, it is assumed that, the in the forward direction of an optical sensor, one detecting cell has a width equal to the length for the optical sensor to advance four times. However, this is not a limitation for the invention. The relationship between such width and length can be varied according to specification without affecting the performance of this invention. The distance for the optical sensor to advance once is called one original pixel width. For example, the original pixel 100, 101 and 102 as shown in FIG. 1 are defined as the original pixels. As a detecting cell is greater than the distance that the optical sensor advances once, many light beams from several original pixels are received each time the detecting cell detects. The result of such detection is called a scanned pixel, that is, the scanned pixels 120, 122 and 124 as shown in FIG. 1. In addition, the pixel points corresponding to each original pixel obtained by the scanned pixel are illustrated as the series of the pixel points 140, 141 and 142 in FIG. 1.

In this embodiment, the scanned pixel is obtained by averaging the sum of the brightness of all the original pixels in the scanning range. Therefore, the brightness of the scanned pixel 120 is the average brightness of the original pixels 100, 101, 102 and 103. If the brightness of the original pixels 100-108 is $a0, a1, a2, a3, \_, a8$, the brightness of the scanned pixels 120-130 is $D0, D1, \_, D8$ is:

$$D0=(a0+a1+a2+a3)/4$$

$$D1=(a1+a2+a3+a4)/4$$

$$D2=(a2+a3+a4+a5)/4$$

$$D3=(a3+a4+a5+a6)/4$$

$$D4=(a4+a5+a6+a7)/4$$

$$D5=(a5+a6+a7+a8)/4$$

When using the original pixels 100-103 as the smooth image region with a uniform brightness, $$a0=a1=a2=a3=D0$$

$$a4=4*D1-a3-a2-a1$$

$$a5=4*D2-a4-a3-a2$$

$$a6=4*D3-a5-a4-a3$$

$$a7=4*D4-a6-a5-a4$$

$$a8=4*D5-a7-a6-a5$$

Thus, after obtaining the brightness of original pixels 100-103, the brightness of other original pixels can be obtained. For simplicity, the brightness obtained by calculating the scanning brightness of the original pixels in the smooth image region is called the calculated smooth brightness. The brightness obtained by calculating the scanned brightness of the original pixels in the document is called the calculated brightness. For example, the pixels 140, 141, 142 and 143 are the calculated smooth brightness, while the pixels 144, 145 and 146 are the calculated brightness.

Figure 2:
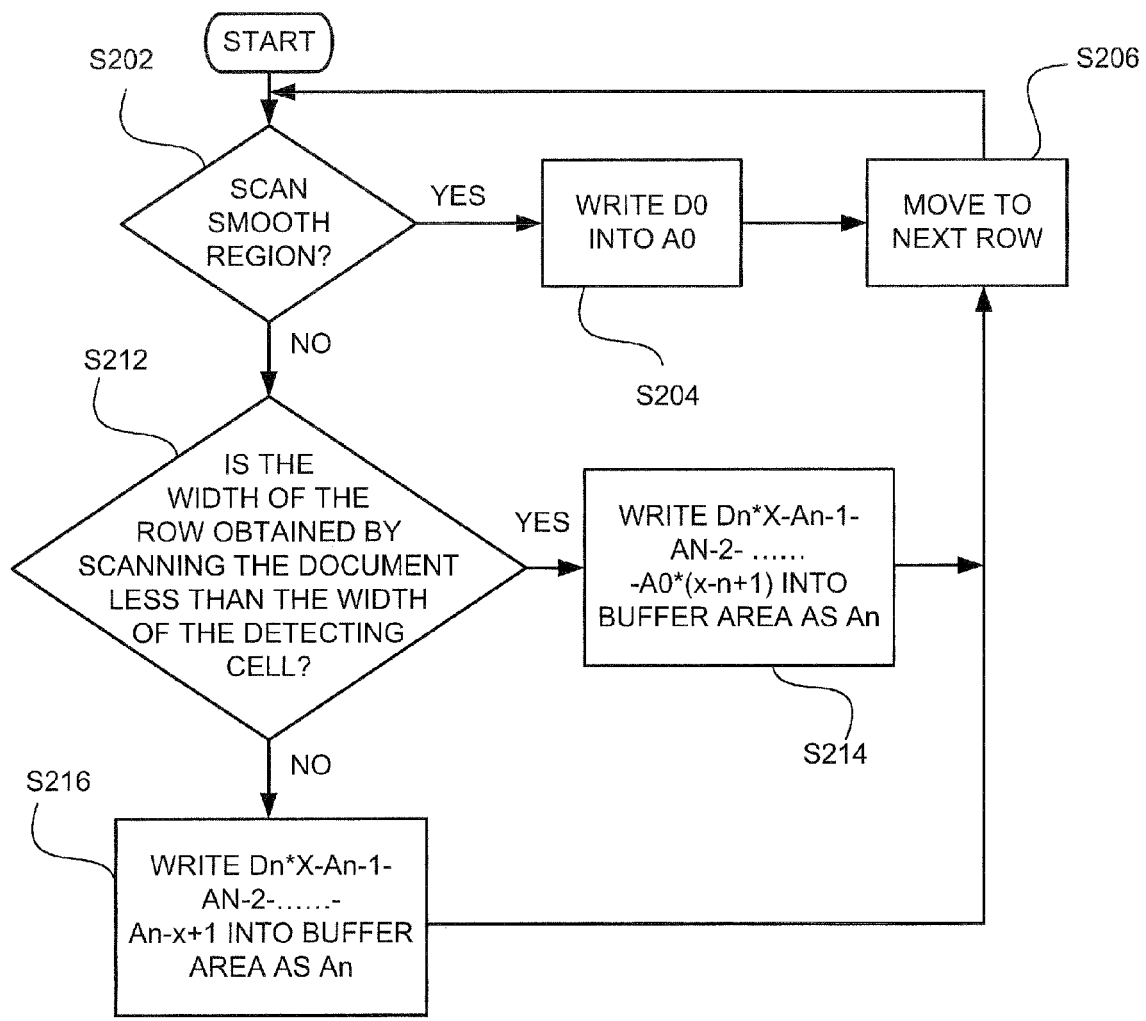
FIG. 2 is a flow chart showing the embodiment of the invention.

FIG. 2 shows a flow chart of the above embodiment. In step s202, whether the smooth image region is scanned is determined. If the scanning part is the smooth image region, in step 204, the scanned brightness D0 is in a form of the calculated smooth brightness A0. After scanning one row, in step s206, the optical sensor moves the next row in the forward direction, and goes back to step s202 to confirm whether it is still in the smooth image region. If not, the process goes to step s212. In step s212, the number of row for the scanned pixels obtained by scanning the document is obtained. In this embodiment, the number of the original pixels that the detecting cell can detect is X (the predetermined number hereinafter). The original pixel with the brightness as the calculated brightness to be obtained is located in the n row of the document. Thus, prior to the original pixel with the brightness to be calculated, there are n−1 original pixels (the pre-pixel number hereinafter) in the forward direction of the optical sensor.

In step s212, if the row number of the scanned pixels obtained by scanning the document is less than the predetermined number minus one, the brightness of the scanned pixel Dn is multiplied by X (predetermined number) to obtain a multiplication result in the step s214. And the brightness of the original pixel prior to the original pixel (An−1, An−2, . . . etc.) and a difference between the row number of the scanned pixel and the pre-pixel number minus one (X−n) are further subtracted from the multiplication result to obtain a subtracted result. The subtracted result is then multiplied to the calculated smooth brightness. A brightness of the corresponding original pixel (An) is thus obtained. If the row number of the scanned pixel obtained by scanning the document is greater than the predetermined number minus one, step s216 is performed. In step s216, the brightness of scanned pixel multiplied by the predetermined number (Dn*X) is deducted by the brightness of the original pixel with a number of predetermined number minus 1 (X−1) prior to the original pixel with the brightness to be calculated. Accordingly, the brightness (An) of the corresponding original pixel is obtained After step s214 or s216, the process goes back to step s206 until the whole document is scanned.

Figure 3:
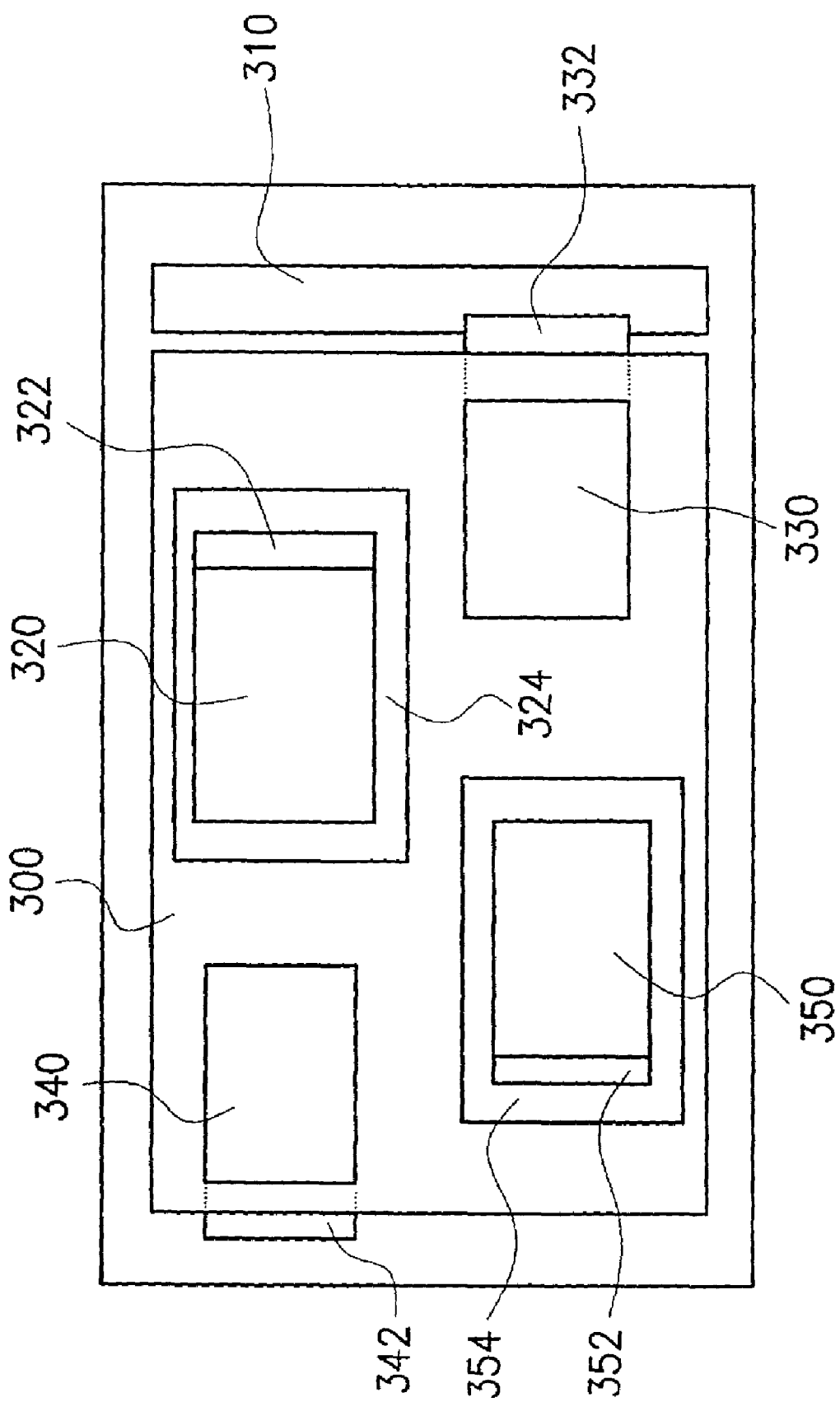
FIG. 3 is a schematic drawing showing the position of the smooth image region of the embodiment of the invention.

It is worth noting that though the brightness of the smooth image region has to be obtained prior to obtaining the brightness of each original pixel, this is not a limitation of the invention. In FIG. 3, the position of the smooth image range is shown. In the scanner, the scanning region 300 is the part that locates the document for scanning. The correction board is the apparatus that corrects the brightness standard of the optical sensor. A typical correction board is monochromatic. Therefore, the correction board 310 is a very good choice of the smooth image region. Under such consideration, the smooth image region 332 is partly located in the range of the correction board 310. While scanning the document 330, a calculated smooth brightness is obtained from the smooth image region 332 to obtain an image with a high resolution. Before scanning the document 320, the smooth scanned region 322 can be scanned first to obtain the calculated smooth brightness for further calculation. The frame 324 is to clearly denote the positions the document 320 and the smooth image region 322 only, not a necessary device in the invention.

While scanning the documents 340 and 350, the smooth image region 342 and 352 are located behind the corresponding documents 340 and 350. In these two embodiments, the optical sensor scans the documents 340 and 350 first, and then scans the smooth image regions 342 and 352. After scanning the smooth image regions 342 and 352, the brightness by scanning the documents 342 and 352 is calculated to obtain the optimum effect of modulation transfer function.

In the embodiments as shown in FIG. 1 and FIG. 2, the calculated brightness of the smooth image region is used as a reference to calculate the brightness of other pixels. It is known to people of ordinary skill in the art that the invention is not restricted thereby. One can obtain the scanned image of the documents first, and then perform a calculation for each point. The selection of the smooth image region can be made in advance, or in a pre-scan step.

According to the above, the invention uses the brightness of the smooth image region as a calculation standard. A better resolution and improved modulation transfer function can be obtained.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of enhancing scan resolution, suitable for use in a scanner with an optical sensor, the optical sensor having a detecting cell that can detect a range comprising a predetermined number of two or more original pixels, the method comprising:

scanning a smooth image region that is separate from a document, wherein the smooth image region comprises at least the predetermined number of original pixels, and wherein the smooth image region comprises a generally uniform brightness;

determining a smooth brightness from the scanned smooth image region, wherein the smooth brightness corresponds to the generally uniform brightness of the smooth image region;

scanning a range of multiple original pixels, wherein one or more of the scanned original pixels correspond to the document; and determining a brightness of at least one of the scanned original pixels corresponding to the document based, at least in part, on the smooth brightness.

2. The method according to claim 1, wherein the smooth brightness is determined prior to scanning the document.

3. The method according to claim 2, wherein the determining the brightness of at least one of the scanned original pixels corresponding to the document further comprises:

obtaining a calculated smooth brightness of the original pixels corresponding to the smooth image region; and using a calculated brightness corresponding to the original pixels in the smooth image region as a standard to calculate the calculated brightness corresponding to original pixels of the document.

4. The method according to claim 3, further comprising:

when there are original pixels with a pre-pixel number prior to the original pixels to be calculated, calculating the calculated brightness corresponding to the original pixels in the document;

comparing the brightness of a scanned pixel to the brightness of the original pixels with a number equal to the predetermined number minus one prior to the original pixels to be calculated when the pre-pixel number is greater than or equal to the predetermined number minus one, so as to obtain the calculated brightness of the original pixels to be calculated; and comparing the brightness of the scanned pixels to the brightness of the calculated brightness corresponding to the original pixels prior to the original pixels to be calculated, and the smooth calculated brightness of the original pixels with the predetermined number minus the pre-pixel number and minus one when the pre-pixel is smaller than the predetermined number minus one, so as to obtain the calculated brightness of the original pixels to be calculated.

5. The method according to claim 3, wherein the calculating the calculated brightness corresponding to the original pixels in the document comprises performing a real time calculation while scanning the document.

6. The method according to claim 3, wherein the calculating the calculated brightness corresponding to the original pixels in the document comprises calculating after scanning the document.

7. A method of enhancing scan resolution, suitable for use in a scanner with an optical sensor, the optical sensor having a detecting cell that can detect a range comprising a predetermined number of two or more original pixels, the method comprising:

scanning a smooth image region that is separate from a document to obtain a smooth image data, wherein the smooth image region comprises at least the predetermined number of original pixels, and wherein the smooth image region comprises a generally uniform brightness;

determining a smooth brightness from the smooth image data, wherein the smooth brightness corresponds to the generally uniform brightness of the smooth image region; and determining a brightness of scanned images obtained by scanning the document based, at least in part, on the smooth brightness, wherein the smooth image data is obtained after scanning the document.

8. The method according to claim 7, wherein the determining the brightness of the scanned images further comprises:

obtaining a calculated smooth brightness of original pixels from one or more portions of the scanned images corresponding to the smooth image region; and using the calculated smooth brightness of the original pixels as a standard to calculate the brightness corresponding to scanned images of the document.

9. The method according to claim 8, further comprising:

when there are original pixels with a pre-pixel number prior to the original pixels to be calculated, calculating the calculated brightness corresponding to the original pixels in the document;

comparing the brightness of a scanned pixel to the brightness of the original pixels with a number equal to the predetermined number minus one prior to the original pixels to be calculated when the pre-pixel number is greater than or equal to the predetermined number minus one, so as to obtain the calculated brightness of the original pixels to be calculated; and comparing the brightness of the scanned pixels to the brightness of the calculated brightness corresponding to the original pixels prior to the original pixels to be calculated, and the smooth calculated brightness of the original pixels with the predetermined number minus the pre-pixel number and minus one when the pre-pixel is smaller than the predetermined number minus one, so as to obtain the calculated brightness of the original pixels to be calculated.

10. A method of enhancing scan resolution, suitable for use in a scanner with an optical sensor, the optical sensor having a detecting cell that can detect a range comprising a predetermined number of two or more original pixels, the method comprising:

scanning a smooth image region to obtain a smooth image data, wherein the smooth image region comprises at least the predetermined number of original pixels and a generally uniform brightness; and processing scanned images obtained by scanning a document according to the smooth image data, wherein processing the scanned images comprises:

obtaining a calculated smooth brightness of the original pixels corresponding to scanned pixels of the smooth image data; and using the calculated smooth brightness corresponding to the original pixels with the predetermined number minus one in the smooth image region as a standard to calculate a calculated brightness corresponding to original pixels of the document.

11. The method according to claim 10, wherein the smooth image data is obtained prior to scanning the document.

12. The method according to claim 10, wherein when there are original pixels with a pre-pixel number prior to the original pixels to be calculated, calculating the calculated brightness corresponding to the original pixels in the document, wherein the calculating comprises:

comparing the brightness of a scanned pixel to the brightness of the original pixels with a number equal to the predetermined number minus one prior to the original pixels to be calculated when the pre-pixel number is greater than or equal to the predetermined number minus one, so as to obtain the calculated brightness of the original pixels to be calculated; and comparing the brightness of the scanned pixels to the brightness of the calculated brightness corresponding to the original pixels prior to the original pixels to be calculated, and the smooth calculated brightness of the original pixels with the predetermined number minus the pre-pixel number and minus one when the pre-pixel is smaller than the predetermined number minus one, so as to obtain the calculated brightness of the original pixels to be calculated.

13. The method according to claim 10, wherein the calculating the calculated brightness corresponding to the original pixels in the document comprises performing a real time calculation while scanning the document.

14. The method according to claim 10, wherein the calculating the calculated brightness corresponding to the original pixels in the document comprises calculating after scanning the document.

15. The method according to claim 10, wherein the smooth image data is obtained after scanning the document.

16. A method, comprising:
scanning a smooth image region separate from another image region, the smooth image region having a generally uniform brightness;
obtaining a standard brightness from the smooth image region, wherein the standard brightness corresponds to the generally uniform brightness of the smooth image region; and
scanning a predetermined number of multiple original pixels, wherein one or more of the scanned original pixels correspond to the other image region; and
determining a calculated brightness for at least one of the scanned original pixels corresponding to the other image region based at least in part on the standard brightness.

17. The method according to claim 16, wherein the other image region comprises at least a portion with a non-uniform brightness.

18. The method according to claim 16, wherein the scanning of the smooth image region with the generally uniform brightness is performed prior to scanning the other image region.

19. The method according to claim 16, wherein the scanning of the smooth image region with the generally uniform brightness is performed after scanning the other image region.

20. A storage medium, comprising one or more instructions thereon that, if executed, result in:
enhancing scan resolution in a scanner with an optical sensor having a detecting cell that can detect a range including a predetermined number of two or more original pixels, wherein enhancing scan resolution comprises:
scanning a smooth image region to obtain a smooth image data, wherein the smooth image region comprises at least the predetermined number of original pixels and a generally uniform brightness; and
processing scanned images obtained by scanning a document according to the smooth image data, wherein processing the scanned images comprises:
obtaining a calculated smooth brightness of the original pixels corresponding scanned pixels of the smooth image data; and
using a calculated smooth brightness corresponding to the original pixels with the predetermined number minus one in the smooth image region as a standard to calculate a calculated brightness corresponding to original pixels of the document.

21. The storage medium of claim 20, wherein the smooth image data is obtained prior to scanning the document.

22. The storage medium of claim 20, wherein when there are original pixels with a pre-pixel number prior to the original pixels to be calculated, the instructions, if executed, further result in calculating the calculated brightness corresponding to the original pixels in the document, wherein the calculating comprises:
comparing the brightness of a scanned pixel to the brightness of the original pixels with a number equal to the predetermined number minus one prior to the original pixels to be calculated when the pre-pixel number is greater than or equal to the predetermined number minus one, so as to obtain the calculated brightness of the original pixels to be calculated; and
comparing the brightness of the scanned pixels to the brightness of the calculated brightness corresponding to the original pixels prior to the original pixels to be calculated, and the smooth calculated brightness of the original pixels with the predetermined number minus the pre-pixel number and minus one when the pre-pixel is smaller than the predetermined number minus one, so as to obtain the calculated brightness of the original pixels to be calculated.

23. The storage medium of claim 20, wherein the calculating the calculated brightness corresponding to the original pixels in the document comprises performing a real time calculation while scanning the document.

24. The storage medium of claim 20, wherein the calculating the calculated brightness corresponding to the original pixels in the document comprises calculating after scanning the document.

25. The storage medium of claim 20, wherein the smooth image data is obtained after scanning the document.

26. A computer-readable storage medium, comprising one or more instructions thereon that, if executed, result in:
scanning a smooth image region that is separate from another image region, the smooth image region having a generally uniform brightness;
obtaining a standard brightness from the smooth image region, wherein the standard brightness corresponds to the generally uniform brightness of the smooth image region; and
scanning a predetermined number of multiple original pixels, wherein one or more of the scanned original pixels correspond to the other image region; and
determining a calculated brightness for at least one of the scanned original pixels corresponding to the other image region based at least in part on the standard brightness.

27. The computer-readable storage medium of claim 26, wherein the other image region comprises at least a portion with a non-uniform brightness.

28. The computer-readable storage medium of claim 26, wherein the scanning of the smooth image region with the generally uniform brightness is performed prior to scanning the other image region.

29. The computer-readable storage medium of claim 26, wherein the scanning of the smooth image region with the generally uniform brightness is performed after scanning the other image region.

30. An apparatus, comprising:
means for scanning a smooth image region that is separate from another image region, the smooth image region having a generally uniform brightness;
means for obtaining a standard brightness from the smooth image region, wherein the standard brightness corresponds to the generally uniform brightness of the smooth image region;
means for scanning a predetermined number of multiple original pixels, wherein one or more of the scanned original pixels correspond to the other image region; and
means for determining a calculated brightness for at least one of the scanned original pixels corresponding to the other image region based at least in part on the standard brightness.

31. The apparatus of claim 30, wherein the means for determining the calculated brightness for at least a portion of the other image region based at least in part on the standard brightness comprise means for determining the calculated brightness for at least a portion of the other image region having a non-uniform brightness.

32. The apparatus of claim 30, wherein the means for scanning of the smooth image region with the generally uniform brightness comprise means for scanning of the smooth image region with a uniform brightness prior to scanning the other image region.

33. The apparatus of claim 30, wherein the means for scanning of the smooth image region with the generally uniform brightness comprise means for scanning of the smooth image region with a uniform brightness after scanning the other image region.

34. A system, comprising:
  a sensor capable of scanning a smooth image region with a generally uniform brightness separately from scanning a range of multiple original pixels, wherein one or more of the scanned original pixels correspond to another image region; and
  a scanner capable of obtaining a standard brightness from the smooth image region, wherein the standard brightness corresponds to the generally uniform brightness of the smooth image region, and wherein the scanner is capable of determining a calculated brightness for at least one of the scanned original pixels corresponding to the other image region based at least in part on the standard brightness.

35. The system of claim 34, wherein the scanner is capable of determining the calculated brightness for at least a portion of the other image region having a non-uniform brightness.

* * * * *